United States Patent

[11] 3,572,670

[72] Inventor Thomas Gordon Hart
San Francisco, Calif.
[21] Appl. No. 847,760
[22] Filed May 26, 1969
Division of Ser. No. 551,828, April 26, 1966, Pat. No. 3,501,292.
[45] Patented Mar. 30, 1971
[73] Assignee Phelps Dodge Corporation
New York, N.Y.

[54] PURIFICATION OF ELECTROLYTIC COPPER
8 Claims, 8 Drawing Figs.
[52] U.S. Cl. .................................................. 266/33, 75/65, 75/72
[51] Int. Cl. ............................................. C22b 15/14

[50] Field of Search ........................................ 266/33, 34 (V)

[56] References Cited
UNITED STATES PATENTS
| | | | |
|---|---|---|---|
| 2,158,625 | 5/1939 | Heuer.......................... | 266/33 |
| 2,960,331 | 11/1960 | Hanks .......................... | 266/34 |
| 3,226,223 | 12/1965 | Bussard et al................. | 266/33 |

Primary Examiner—Gerald A. Dost
Attorney—Davis, Hoxie, Faithfull & Hapgood

ABSTRACT: Apparatus for suspending and heating copper cathode plates in a hydrogen atmosphere for such purposes as oxygen removal, and in a vacuum for melting and removal of volatile or gaseous impurities by progressively melting with radiant heat the lower region of the suspended plates to create a thin molten film which drips off the plates.

Patented March 30, 1971

INVENTOR.
THOMAS G. HART

BY

ATTORNEYS.

INVENTOR.
THOMAS G. HART

BY
Davis, Hoxie, Faithfull & Hapgood

ATTORNEYS.

INVENTOR.
THOMAS G. HART
BY

ATTORNEYS.

PURIFICATION OF ELECTROLYTIC COPPER

This application is a division of Ser. No. 551,828, filed Apr. 26, 1966, now U.S. Pat. No. 3,501,292.

This invention relates to the purification of copper and particularly to the purification of electrolytically refined copper by a process involving both hydrogen treatment and vacuum treatment.

The present invention is concerned with means for treating copper so as mainly to remove oxygen, sulfur and volatile impurities such as lead, bismuth and tellurium. Optimum purification is achieved according to this invention by turning to advantage certain peculiarities in the configuration, the structure and the impurity distribution of electrolytic cathode-plate copper so as to remove oxygen, sulfur and volatile impurities from this copper in optimum fashion.

The impurity distribution of electrolytic cathode-plate copper, hereinafter called "cathode copper," is peculiar in that the oxygen and sulfur impurities are largely confined to the surfaces. Further, cathode copper being in the form of flat plates, affords an unusually large surface area in relation to volume. Moreover, cathode copper has a fine crystalline structure which permits progressive melting without tendency to melt off in lumps as is the case with the coarse crystalline structure of cast copper.

According to the invention, advantage is taken of the confinement to the surfaces of the oxygen and sulfur impurities in cathode copper by the use of surface treatments to remove these impurities. Surface treatment of copper, particularly gaseous surface treatment, for removing oxygen and sulfur from the copper, has been discussed in my copending Ser. No. 478,612, filed Aug. 10, 1965 and now abandoned. That application concerns a novel method of combining hydrogen treatment with vacuum treatment so as to remove oxygen, sulfur and volatile impurities from any type of copper and makes particular note of the fact that oxygen and sulfur removal from cathode copper is most expeditiously accomplished before the cathode copper is melted because the oxygen and sulfur are then most accessible and because the byproduct gases produced as a consequence of the hydrogen action can then most easily escape. The present invention supplements the teaching of Ser. No. 478,612 by teaching how, in addition to making use of the surface confinement of impurities of cathode copper, as by hydrogen treating prior to melting, effective use can also be made of the high surface area to volume ratio and the smooth melting characteristics of cathode copper for efficiently further removing impurities therefrom.

The broad purpose of the present invention is accordingly to provide an optimum method for removing oxygen, sulfur and volatile impurities such as lead, bismuth and tellurium from cathode copper. Somewhat narrower purposes are as follows:

First, to provide means for heating cathode copper in controlled atmosphere so as to substantially remove oxygen and sulfor, at least from the surfaces;

second, to provide means for heating cathode copper, from which oxygen has been substantially removed, in an atmosphere containing hydrogen so as to dissolve hydrogen in the copper;

third, to provide means for melting cathode copper in an atmosphere containing hydrogen so as to dissolve hydrogen in the copper;

fourth, to provide optimum means for melting cathode copper in an atmosphere having very low pressure compared to atmospheric pressure so as to remove dissolved gasses and volatile impurities; and fifth, to provide preferred apparatuses for accomplishing the above purposes.

Toward the above purposes, the following factors have particular importance:

Insofar as is concerned the efficiency of hydrogen treatment of cathode copper in removing sulfur and oxygen, an important factor is, as explained at some length in my copending Ser. No. 478,612 that this treatment be accomplished while the oxygen and sulfur are still largely confined to the surfaces which is to say before the cathode copper is melted. Also of importance is that whereas the extent of oxygen removal from the solid cathode copper by prolonged hydrogen treatment is largely independent of the amount of sulfur present, the extent of sulfur removal by this treatment may depend heavily on the amount of oxygen present. This is to say sulfur is not invariably removed from the surfaces of solid cathode copper by prolonged heating in an atmosphere containing hydrogen if oxygen is absent, depending absent, depending on such things as the nature of the compounds which contain the sulfur and upon the presence of constituents such as water vapor in the hydrogen bearing atmosphere. This is further to say that generally sulfur removal by hydrogen treatment is facilitated by the presence of an amount of oxygen in the copper somewhat in excess of the amount normally found in fresh cathode copper. Hence the purpose will be understood of slightly further oxidizing the cathode copper surfaces, as by heating in air, for example at 600° C. for five minutes, before hydrogen treatment.

Insofar as is concerned the efficiency of the hydrogen treatment of solid cathode copper in dissolving hydrogen in the copper, so as thereby to facilitate the removal of volatile impurities by causing agitation during the subsequent vacuum treatment as disclosed in Ser. No. 478,612, an important factor is that as much as possible of the solid copper surface be freely exposed to the hydrogen bearing atmosphere. This is because the rate at which hydrogen dissolves into the solid cathode copper, at a particular temperature and with a particular proportion of hydrogen in the atmosphere, is proportional to the copper surface area exposed to the atmosphere. Hence the disadvantage will be understood, in terms of length of time required, for example, to saturate the solid cathode copper with hydrogen, of bundling the cathode copper together so as to be treated.

Insofar as is concerned the efficiency of the vacuum treatment of the molten cathode copper in removing dissolved gasses such as hydrogen and volatile impurities such as lead, an important factor is again that a maximum copper surface area be exposed to the treatment. This is because the rates at which dissolved gasses and volatile impurities are removed from molten copper, at a particular temperature and environmental gas pressure in a particular vacuum treatment apparatus, are proportional to the molten copper surface area exposed to the vacuum treatment. Hence, the disadvantage will be understood, in terms of length of time required to, for example, substantially remove the lead from a batch of molten copper, of containing this molten copper in, for example, a conventional crucible type melting vessel so as to be vacuum treated.

From the above it will be generally understood that the essence of the present invention is in taking advantage of the peculiar impurity distribution, peculiar shape, and peculiar melting characteristics of cathode copper so as to provide maximal surface exposure throughout the treatment process and so as to obtain thereby most efficient removal of oxygen, sulfur and volatile impurities.

The means of the present invention for taking advantage of the peculiar characteristics of cathode copper as outlined above so as to accomplish efficient impurity removal will be understood form the following descriptions of preferred apparatus in conjunction with the following drawings of which:

Figure 1:
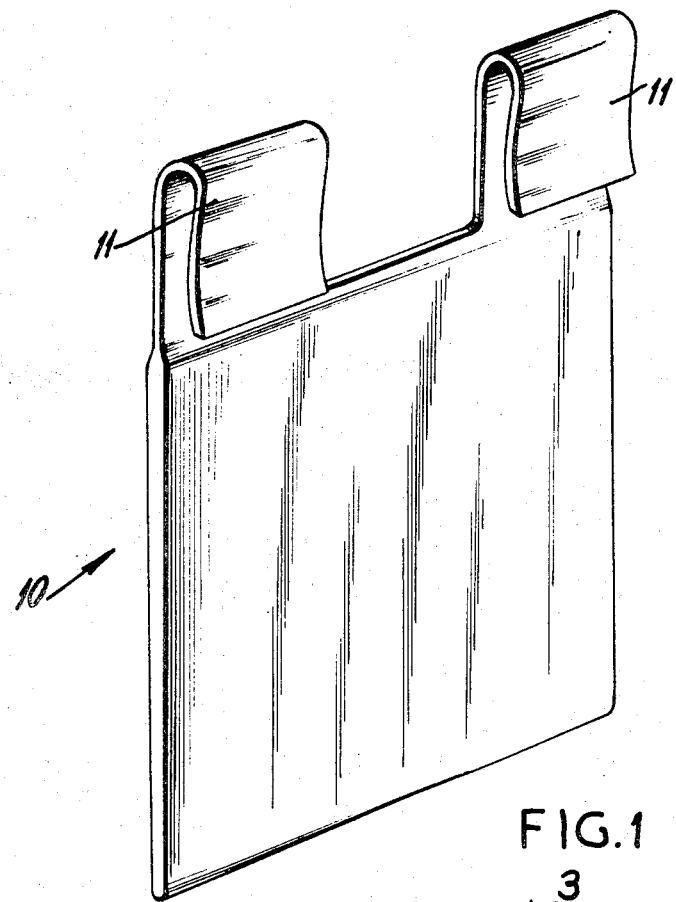
FIG. 1 is a perspective view of a cathode copper plate.

Attention is now directed to FIG. 1 which illustrates a typical cathode copper plate 10 hereafter termed a "cathode." With reference to FIG. 1, the length, the breadth, and the thickness of cathode 10 are respectively approximately 3 feet, 3 feet, and three-fourths inch. Two identical suspension loops 11 are extensions of the thin copper "starter" sheet onto which the cathode is electrolytically deposited. Suspension loops 11 are primarily for suspending the starter sheet in the electrolytic tank while the cathode is being deposited on the sheet, but, as will be seen later, are also used for suspending the cathode during purification treatment. The starter sheet, which does not appear as such in FIG. 1 having become an integral part of the cathode, is usually deposited onto on both sides and is therefore usually located approximately at the center of the cathode. It is of some importance in the manufacture of cathodes intended for further purification that the starter sheets be free at least of oily contaminants before being used for deposition of cathodes since these contaminants, becoming embedded within the cathode, can contribute undesirably to the gas evolution during the vacuum treatment.

Figure 2:
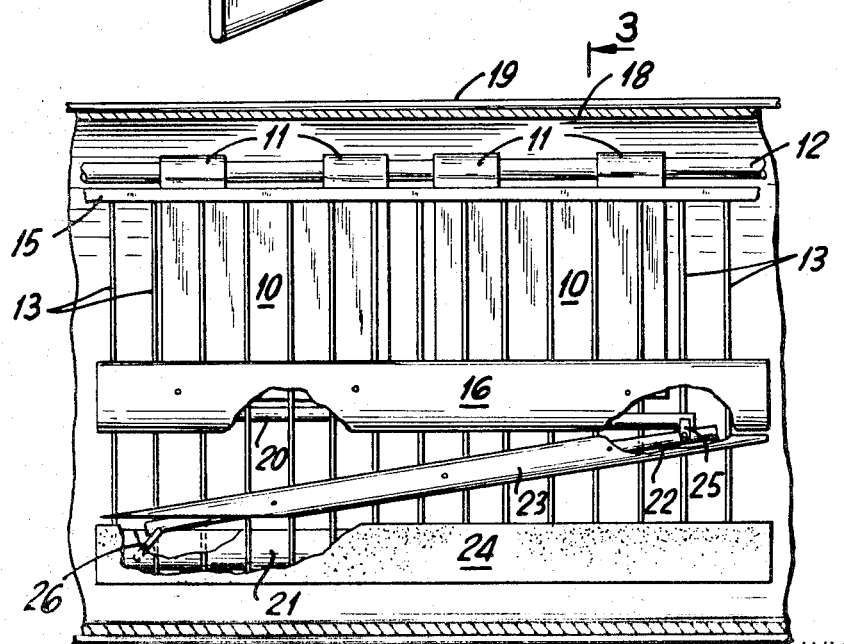
FIG. 2 is a view partially in section of an apparatus for carrying out the present invention.
Figure 3:
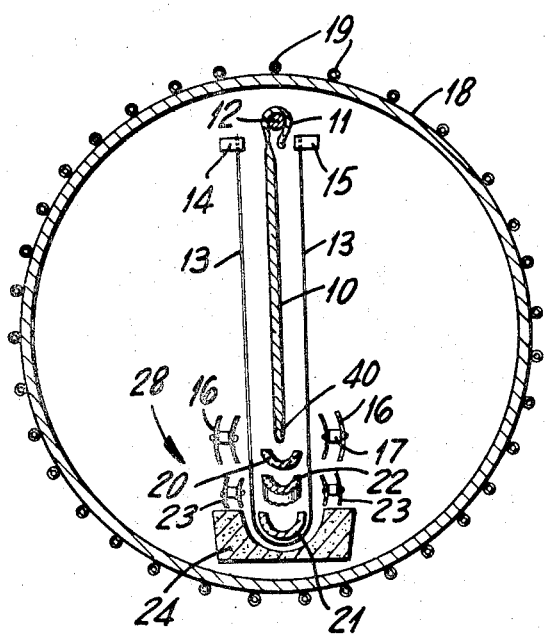
FIG. 3 is a cross-sectional view of the apparatus of FIG. 2.

Attention is now directed to FIG. 2 which illustrates, somewhat diagrammatically, the main features of an apparatus for progressively melting cathodes. With reference to FIG. 3 which is a cross-sectional view of FIG. 2, 10 is the cross section of a cathode suspended by loop 11 which is threaded by tube 12. 13 is one of a number of U-shaped heating elements spaced one behind the other along the breadth of the cathode, made for example of molybdenum wire, terminating at the upper ends in terminals 14 and 15 across which a voltage is maintained so as to supply elements 13 with heating current. 16 is the cross section of two identical heat reflectors, located one each side of the heating elements 13, extending along the breadth of the cathode, and moveable up and down the length of the cathode by means not shown. Heat reflectors 16 are, for example, each made of a number of pieces of high-temperature steel sheet, these pieces being separated by refractory ceramic spacers 17. 18 is the cross section of an enclosure such as a cylindrical steel tank, and 19 is the cross section of one of a number of water cooled coils which girdle the tank so as to cool the walls. It will be readily understood that in the absence of heat reflectors 16, for example if reflectors 16 are moved down below the bottom of cathode 10, the loss of heat by radiation from elements 13 and from cathode 10 heated by elements 13 is substantial. Hence, it will be understood that, with reflectors 16 below the bottom of cathode 10 and with elements 13 supplied with sufficient electrical current via terminals 14 and 15 to maintain cathode 10 at say about 1,000° C., as reflectors 16 are moved up so as to envelop the bottom of cathode 10 the consequent reduction in heat loss from the bottoms of elements 13 and the bottom of cathode 10 is generally sufficient to raise the temperature of the bottoms of elements 13 by a few hundred degrees and to melt the bottom of cathode 10. Hence further, it will be understood that, with sufficient current supplied to elements 13 to raise the temperature of cathode 10 to say about 1,000° C. in the absence of reflectors 16, as reflectors 16 are slowly moved from below the bottom of cathode 10 up to a position just below loops 11, cathode 10 will be progressively melted from bottom to top leaving unmelted only loops 11. So that loops 11 retain sufficient strength to support cathode 10 throughout the above melting operation loops 11 are cooled by circulating water through tube 12. The maximum speed of movement of reflectors 16 so as to accomplish the progressive melting of cathode 10, as above, is determined by a number of factors including the type of atmosphere in enclosure 18, the width and spacing of elements 13, the spacing, size, number of layers and surface condition of reflectors 16, the surface condition of cathode 10 and the temperature attained by cathode 10 in the absence of reflectors 16. However, any speed of movement of reflectors 16 below this maximum speed results in uniform progressive melting from bottom to top of cathode 10, which is to say the length of cathode 10 is reduced at substantially the same rate as the movement of reflectors 16, the melting bottom edge of cathode 10 remaining within the gap between reflectors 16 and remaining substantially straight and parallel with the length of reflectors 16. Such uniform progressive melting of cathode 10 from bottom to top without tendency to melt off irregularly in lumps leaving an irregular lower edge is, as already noted, largely due to the fine crystalline structure of cathode 10 which is a normal characteristic of electrolytically deposited copper. The only impediment to uniform progressive melting of cathode 10 as above would be the presence on the cathode of large nodules as can sometimes appear growing out from the surfaces of cathode copper due to vagaries of the electrolytic deposition process. If the nodules are large enough to significantly affect melting uniformity the inconvenience they cause in respect of such matters as general handling and potential damage to heating elements 13 in any case warrants their avoidance by closer control of the deposition process.

In continuation of the detail of FIG. 3, 20 is the drip channel which catches and leads away the molten copper dripping from cathode 10 as cathode 10 is progressively melted as above. Drip channel 20, made for example of graphite, moves with reflectors 16, by means not shown, so as to maintain a fixed separation from the melting bottom edge of cathode 10 and is slightly sloped so that the molten copper flows towards one end. The location of channel 20 within the U-shape of elements 13 and within the gap between reflectors 16—this region being termed hereafter the "melt-region"—ensures that the temperature of channel 20 is maintained above copper melting temperature. Channel 20 empties into a holding trough 21, made for example of refractory ceramic, which is stationary with respect to elements 13 and which is consequently separated increasingly from drip channel 20 as reflectors 16 and drip channel 20 move up cathode 10. Partly to accommodate the increasing separation of holding trough 21 from drip channel 20 so as to avoid splashing as would result were channel 20 merely to drip at one end into trough 21, connection channel 22, made for example of graphite, connects at one end to the lower end of channel 20 and at the other end to one end of trough 21; thus, as is better illustrated in side view in FIG. 2, one end of channel 22 moves with drip channel 20 while the other end of channel 22 remains substantially stationary with holding trough 21. It will be understood that mere location within the U-shape of elements 13 may not be sufficient to maintain channel 22 and trough 21 above the melting point of copper when heating elements 13 are supplied with sufficient current to melt cathode 10 in conjunction with the movement of reflectors 16, as described above; accordingly, reflectors 23 which run parallel to and move with channel 22 and heat-insulating block 24 which partly surrounds trough 21 are provided to keep channel 22 and trough 21 respectively above copper melting temperature.

For clearer understanding of some of the features described above attention is now directed to FIG. 2 which illustrates in side view the apparatus illustrated in cross-sectional view of FIG. 3. For clarity, reflectors 16 and 23 and insulating block 24 are partially cut away to show channels 20 and 22 and trough 21. Two cathodes 10 are shown side by side in FIG. 2 to illustrate how, by using an appropriate number of heating elements 13 and appropriate lengths of parts such as channels, the apparatus is adapted to melting a number of cathodes simultaneously. End pieces to the apparatus, including the ends of enclosure 18, means for moving reflectors 16, means for controlling the atmosphere within enclosure 18, means for placing cathodes within heating elements 13 and means for emptying trough 21, are not shown in FIG. 2. These end piece details are covered in a later description of a complete apparatus, as also are other details incompletely shown in 2 and 3. The only details referenced by number in 2 not referenced in 3 are pivot 25 and rocker arm 26, which are merely to indicate how, as explained above, one end of connecting channel 22 moves up with drip channel 20 as cathodes 10 are melted while the other end stays substantially stationary with trough 22.

Figure 4:
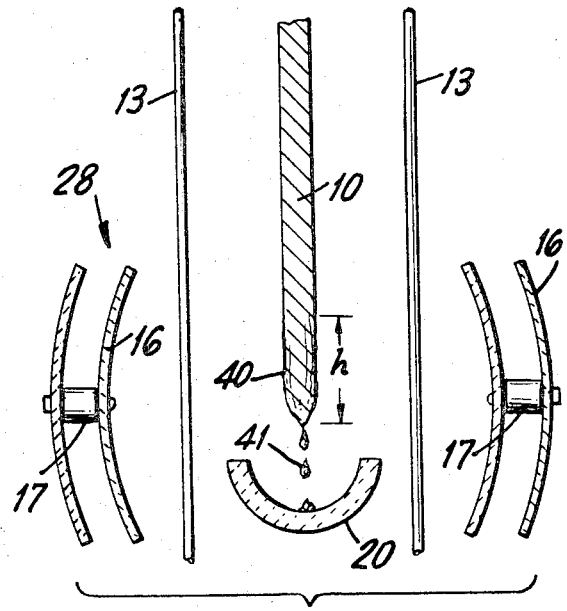
FIG. 4 is an enlarged view of the melting zone illustrated in FIG. 3.
Figure 5:
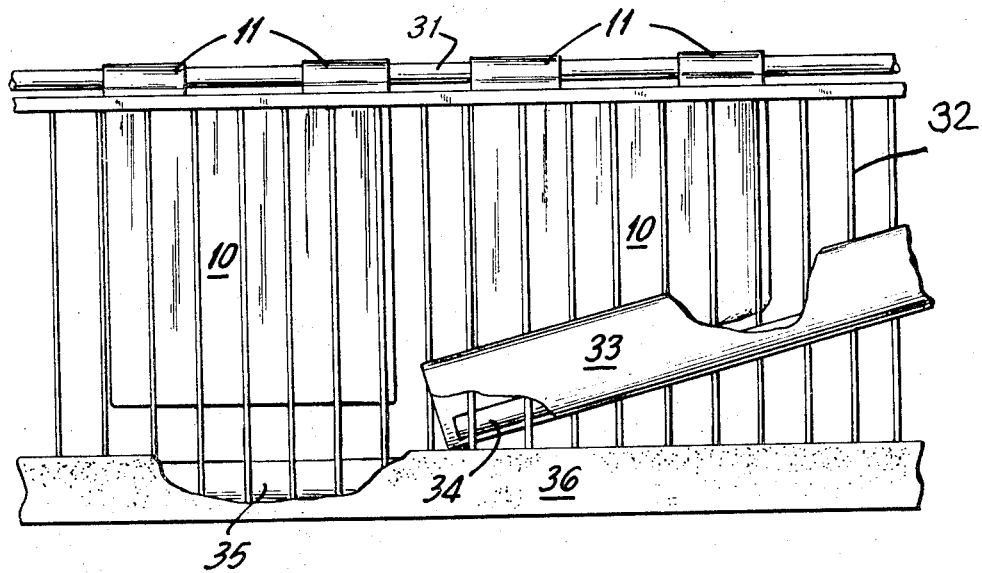
Fig. 5 is a view partially in section of another apparatus embodying the present invention.

From the above description of the main features of apparatus for progressively melting cathodes in accordance with the present invention it will be understood that in this apparatus progressive melting is accomplished essentially by moving the melt region afforded by reflectors 16 and elements 13 from bottom to top of stationary cathodes. The movement between cathodes and melt region is of course relative, hence it will be readily understood that an alternative method of progressive melting is afforded by holding the melt region stationary and by moving instead the cathodes so as to accomplish the same relative movement as before. This alternative method of progressive melting may be accomplished, for example, in apparatus broadly similar to the apparatus of FIGS. 2—4. In this connection attention is now directed to FIG. 5 which illustrates, again somewhat diagrammatically, the side view of apparatus for progressive melting of cathodes by moving cathodes through a stationary melt region. With reference to FIG. 5, two cathodes 10 are suspended side by side on rail 31 along which the cathodes are free to move in horizontal direction within U-shaped heating elements 32 the heating elements 32 being similar in construction to the elements 13 shown in FIG. 2. 33 is one of two stationary heat reflectors similar in shape and construction to movable reflectors 16 shown in FIG. 2. They are disposed one on each side of heating elements 32 so as to create in conjunction with the elements 32 a sloping melt region through which cathodes 10 are moved by movement along rail 31. Within the U-shape of elements 32 and the lower part of the gap between reflectors 33, running parallel to reflectors 33 and hence within the melt region, is a stationary channel 34, similar to channel 22 in FIG. 2, for collecting and leading away the molten copper dripping from cathodes 10 (reflector 33 is partly broken away in two places to reveal channel 34). Below channel 34 and also within the U-shape of elements 32 is trough 35 similar to trough 21 shown in FIG. 2 which runs parallel with the bottoms of elements 32. Partially enveloping trough 35 is heat insulating block 36 (partly broken away in FIG. 5 to reveal trough 35). It will be noted that reflectors 33 extend only partially across the row of heating elements 32, that is, there is a group of reflectorless elements 32 which is not a part of the melt region. This group of reflectorless elements is termed the "preheat zone" and serves to preheat or maintain the temperature of the plates 10 as they are conveyed to the group of heating elements 32 which is termed the "melt zone" which includes the melt region. It will be further noted that the direction of travel of cathodes 10 along rail 31 is from the preheat zone toward the melt zone and that, accordingly, one cathode 10 is shown in the preheat zone, and therefore shown unmelted at the bottom and is moving toward the melt zone. The other cathode 10 in the melt zone is therefore shown melted at the bottom with the bottom edge concealed within reflectors 33. This cathode has traveled to its present position from the preheat zone at a rate sufficiently slow to ensure progressive melting as previously described.

It will be understood from the above that the arrangement of apparatus in FIG. 5 is such that cathodes may be continually fed into the preheat zone so as to continuously move along rail 31 through the preheat zone and through the melt zone, and so as thereby to be continuously preheated and continuously progressively melted. Hence it will be understood that FIG. 5 illustrates a type of progressive melting apparatus that is suitable for a continuous operation during which solid cathodes are continuously fed and molten copper is continuously discharged out of the apparatus. The advantage and disadvantage of the continuous operation of the apparatus of FIG. 5 as compared to the batch operation of the apparatus of FIG. 2 will be brought out in later discussion.

From the above descriptions of a "batch" version and a "continuous" version of apparatus for progressively melting cathodes in accordance with the present invention it will by now be apparent that this apparatus is adaptable, by furnishing a controlled atmosphere around the cathodes while heating and melting, accomplishing at least part of the treatment for purifying cathode copper by the combined hydrogen treatment/vacuum treatment mentioned earlier. This adaption will now be discussed in relation to the "batch" apparatus of FIG. 2.

Returning attention to FIG. 2 it will be evident that three distinct operations may be conducted in this apparatus: Firstly, cathodes may be preheated without melting, for an arbitrary length of time and to an arbitrary temperature below melting temperature, either by moving reflectors 16 below the bottom of the cathodes and by appropriately regulating the current through elements 13 or by moving reflectors 16 up and down at a fast enough rate to ensure melting does not occur and by appropriately regulating the current through elements 13; secondly, the cathodes may be progressively melted at an arbitrary rate below a certain maximum rate, as previously described; and thirdly, melted cathodes may be retained molten in trough 22 for an arbitrary length of time merely by continuing to supply current to elements 13 after the melting operation has been completed and by preventing trough 22 from emptying. Furthermore it will be apparent, since there is no movement of cathodes through the apparatus of FIG. 2, that once the cathodes are in position within elements 13, the ends of enclosure 18 may be sealed off and a variety of atmospheres including, for example, ordinary atmosphere, hydrogen bearing atmosphere and very low-pressure atmosphere, may be furnished within enclosure 18, assuming of course the ability of parts of the apparatus such as elements 13 to withstand all these atmospheres. Hence it will be understood that, for typical example, cathodes may be successively:

A. Heated in normal pressure air for 10 minutes at 600° C.;
B. Further heated in a normal pressure atmosphere composed of 85 percent dry nitrogen and 15 percent dry hydrogen for 20 minutes at 1,000° C.;
C. Melted over a 10-minute period in a low-pressure atmosphere, this atmosphere having a pressure equivalent to about 1 mm. of mercury and being largely composed of gases (mainly hydrogen) issuing from the melting and molten copper; and finally; and
D. Maintained molten for 10 minutes in a low-pressure atmosphere.

The above exampled operations A, B, C, and D constitute a typical optimum procedure (for a particular quality of cathode and a particular desired level of impurity removal) for purifying cathode copper by combined hydrogen treatment and vacuum treatment so as to remove oxygen, sulfur and volatile impurities. It remains therefore, in illustration of the advantages of the present invention, merely to point out how maximal surface exposure, with advantages as previously outlined, is obtained by means of the apparatus of FIG. 2. In this connection the following aspects of operations A, B, C, and D as related to the apparatus of FIG. 2 may now be noted: Concerning operation A, which is the heating in air so as to slightly further oxidize the cathode surface for purpose of facilitating the sulfur removal, as previously described, this operation may be conducted with reflectors 16 below the bottom of cathodes 10, so that the only impediments to uniform circulation of air completely around cathodes 10 (this air being fed, for example, into one end of enclosure 18 and discharged at the other) and hence uniform oxidation of cathodes 10 are elements 13 which, however, being widely spaced relative to thickness are of negligible encumbrance.

Concerning operation B, which is the heating in hydrogen bearing atmosphere so as to remove sulfur and oxygen and so as to dissolve hydrogen in the copper, much the same remarks apply as to operation A above which is to say almost ideal conditions pertain in regard to uniform and unencumbered circulation of atmosphere completely around cathodes 10.

Concerning operation C, which is the melting in a low-pressure atmosphere so as to remove dissolved hydrogen and volatile impurities and which is conducted by progressively melting cathodes as previously described while constantly exhausting enclosure 18 by means of a vacuum pump (for example with both ends of enclosure 18 being completely sealed off except for connection to the vacuum pump), this operation is conveniently assessed in two parts: Firstly, each portion of copper in a cathode is exposed in thin molten section to the low-pressure atmosphere as each portion melts off the cathode. This is to say, the progressive melting operation equivalently spreads a cathode out into a thin sheet of molten copper and exposes each portion of this molten sheet to the low-pressure atmosphere. Secondly, each portion of a cathode after primary exposure to the low-pressure atmosphere while being melted then drips into channel 20 so as to obtain secondary exposure while flowing down channels 20 and 22 into trough 21 and while accumulating in trough 21. This secondary exposure may also be visualized as to the equivalent of the exposure of cathode 10 spread out into the form of a thin sheet of molten copper.

The visualization of the primary and secondary exposure of a cathode in operation C as equivalent to the exposure of a hypothetical thin sheet of molten copper, having the same volume but many times the surface area of the cathode, to the to the low-pressure atmosphere for a hypothetical period of the time depending on the melting rate, is useful in assessing the relative importance of various factors affecting operation C. For example, if the melting bottom edge of cathode 10 is as illustrated in the enlarged cross section of FIG. 4, which is to say melting occurs up the sides of cathode 10 to a distance $h$ of 2 inches, the primary exposure of cathode 10 is roughly the equivalent of exposing a sheet of molten copper 270 square feet in area and 0.025 inch thick to the low-pressure atmosphere for one-tenth second. If distance $h$ is increased to 4 inches (for the same total melting time of 10 minutes) the hypothetical sheet thickness is reduced to about 0.017 inch, the area being increased proportionately, and the hypothetical exposure time is increased to about 0.15 second. As is well known in the vacuum treatment art, increasing exposure area (which is, of course, the same as decreasing sheet thickness for the same volume) and increasing exposure time both contribute to increased impurity removal. Accordingly, the efficiency of the primary exposure of operation C in removing hydrogen and volatile impurities is at least in part affected by distance $h$, the greater being distance $h$ for the same total melting time the greater the efficiency. From this point of view there is therefore advantage in increasing distance $h$ by increasing the depth of the melt region afforded by reflectors 16 in conjunction with elements 13, that is by increasing the depth of reflectors 16. However, there is a limit to the usefulness of increasing the depth of reflectors 16 since an ideal condition for removing volatile impurities such as lead from cathode 10 would be that reflectors 16 were not at all interposed between molten copper flowing down the bottom of the cathode and the cooled walls of enclosure 18 so that only the negligible encumbrance of elements 13 impeded the direct access of lead vapor to the cooled walls of enclosure 18. Accordingly, increasing the depth of reflectors 16 decreases the efficiency of removal of those impurities such as lead which condense on the cooled walls of enclosure 18, that is those impurities termed "volatile impurities." Hence, it will be understood that, depending in part upon the extent of volatile impurity removal required in a particular case, there will be an optimum depth for reflectors 16 which may typically range from 1 to 12 inches, depending of course also on such other factors as the temperature of the cathode before the melting is performed and the distance between reflectors 16. Also significant in determining the efficiency of volatile impurity removal in the primary exposure is the agitation of the molten copper on the surface of the cathode (40 in FIG. 4) due to the rapid release of hydrogen by the action of the low pressure. This agitation is manifest by "frothing" of molten copper 40 as it flows down into drip 41 and drips into channel 20. Generally speaking, this frothing of molten copper 40 equivalently decreases the aforementioned hypothetical sheet thickness and increases the aforementioned hypothetical exposure time and hence increases the efficiency of the primary exposure, particularly in removing the volatile impurities. This improvement in efficiency due to the frothing of molten copper 40 depends mainly on the amount of dissolved hydrogen and on the rate of melting and may typically account for an increase in volatile impurity removal of two or three times as compared to the amount removed under the same conditions but with no hydrogen present. It should be noted that the vigor of this frothing action in part determines an optimum width for the U-shape of elements 13 since small particles of molten copper can be ejected out from molten copper 40 by vigorous frothing so as to escape the confines of elements 13 and consequently channel 20, if the width of elements 13 is too small. Typically, for example, the loss of copper by frothing ejection out of the sides is held to less than a tenth of a percent by an element 13 width of 6 inches.

Concerning the secondary exposure of cathode 10, that is the exposure while dripping into channel 20, while flowing down channel 20 into channel 22, while flowing down channel 22 into trough 21 and while gathering in trough 21, it will be readily understood that this secondary exposure adds considerably to the overall efficiency of operation C, even though of a somewhat different nature from the primary exposure on the bottom of the melting cathode when the frothing action is at its peak and when the molten copper surface is well defined. The contribution that this secondary exposure makes to the overall efficiency of operation C is, as already stated, also conveniently assessed in the equivalent terms of hypothetical sheet thickness and hypothetical exposure time. Depending particularly on channel design, as is well known in the vacuum treatment art, this secondary exposure can, for example, increase the hypothetical equivalent exposure time and decrease the hypothetical equivalent sheet thickness by as much as a factor of three in each case over the time and thickness equivalent to the primary exposure alone. At this point it may conveniently be noted that the reason for assessing the overall efficiency of operation C in equivalent terms of hypothetical sheet thickness and exposure time rather than, more simply, in terms of one figure of merit combining both these factors is that the efficiency of gas removal and the efficiency of volatile impurity removal depend somewhat differently on each of these two factors. This is to say, for example, that whereas the efficiency of gas removal may be relatively unaffected by an increase in exposure time, the gas removal having been substantially completed before the exposure is completed, the efficiency of the volatile impurity removal may be greatly affected, the volatile impurity removal not having been completed when the exposure is complete. Hence, it will be understood that in assessing the overall efficiency of operation C in the equivalent terms of hypothetical sheet thickness and hypothetical exposure time there is afforded a rough basis for determining, independently, the efficiency of gas removal and the efficiency of volatile impurity removal and for optimizing these two efficiencies in relation to a particular requirement.

Concerning the final operation of the typical purification procedure conducted in the apparatus of FIG. 2 namely operation D, which is the holding of the molten copper in trough 21 under low-pressure atmosphere for 10 minutes, this operation has the least effect on the overall efficiency of the procedure. This is because by the time operation D commences, both the gas removal and the volatile impurity removal are normally substantially completed by operation C. Accordingly, the relative inefficiency of operation D in removing gases and volatile impurities, due to the relatively small area of exposure of molten copper in trough 21, is of little consequence. The main purpose of operation D is hence not to contribute to the impurity removal, although in some measure it does, but rather to allow the temperature of molten copper in trough 21 to be adjusted and to regularize preparatory to casting, as will be explained later.

In conclusion of this discussion of a typical purification procedure conducted in the apparatus of FIG. 2, namely operations A, B, C, and D, it may be noted that B and C are the main operations and that the inclusion of operations A and D, in the form as described above, is mainly to show the relation of one or both of these optional operations to the main operations when special problems are present. In practice, operation A, which may or may not be necessary depending on the cathode surface condition as explained earlier, is more conveniently performed in separate apparatus since then apparatus of FIG. 2 may be constructed of materials which are ideally suited to operation in inert, reducing, or low-pressure atmospheres but which are not suited to operation in air at ordinary pressure, for example, molybdenum heating elements and graphite channels. Also in practice, operation D may be modified by performing in an atmosphere such as nitrogen at normal pressure rather than in low-pressure atmosphere, thus sacrificing impurity removal but obtaining the benefit of stabilizing temperature. Hence, it will be understood that the two operations which are of greatest significance in purifying cathode copper according to the present invention are: (1) prolonged heating of suspended cathodes below melting temperature while freely exposing the cathodes to an atmosphere containing hydrogen followed by (2) progressive melting of the suspended, heated cathodes while maintaining a low-pressure atmosphere. Further, it will by now be understood that these two operations are conducted with very high efficiency in apparatus such as diagrammatically illustrated in FIG. 2.

Figure 6:
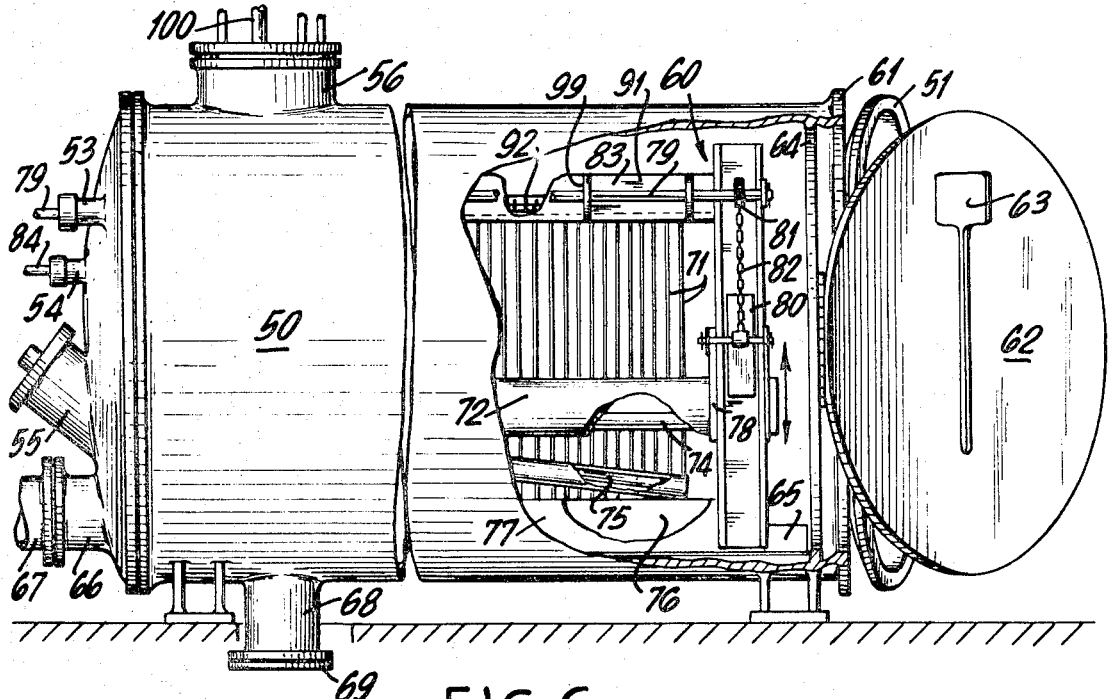
FIG. 6 is a view partially in section of another embodiment of the present invention.

In order to give practical emphasis to the above, attention is now directed to FIG. 6 which illustrates a preferred practical apparatus for purifying cathode copper in batches in accordance with the present invention. It will be noted by comparison with FIG. 2 that many of the details of FIGS. 2 and 6 are substantially identical and consequently such detail will not be further described.

With reference to FIG. 6, 50 is a cylindrical steel tank which encloses the apparatus and 60 is the inner frame which supports a progressive melting assembly much as in FIG. 2. In further detail of tank 50 (broken away to reveal frame 60), 51 is a hinged outer door which in closed position makes a vacuum tight seal on outer flange 61; 62 is a hinged inner door having a slot 63 and in closed position seats onto inner flange 64 so as to make a reasonably gas tight seal; 65 is one of two slides welded onto tank 50 for carrying frame 60 and facilitating the removal of frame 60 for maintenance; 66 is a flanged port for connection to vacuum manifold 67 and thence to the vacuum pumping system which is not shown; 68 is a flanged port having a removable vacuum tight cover 69 for purpose to be explained later; 53 and 54 are vacuum tight entries for rotatable shafts for purpose to be explained later; 55 is a viewing port; and 56 is a utility port mainly for vacuum tight entry of water and electrical supplies.

In further detail of frame 60, 71 is one of the numerous U-shaped heating elements, 72 and 73 are respectively the upper and lower reflectors, 74 and 75 are respectively the drip and connection channels, 76 is the trough and 77 is the heat insulating block, all much as previously described in connection with FIG. 2; 78 is a cradle for carrying reflector 72 and channel 74; shaft 79, counterweight 80, sprocket 81 and chain 82 are part of the conventional mechanical arrangement for raising and lowering cradle 78 and thereby reflector 72 and channel 74; to be explained in further detail later are 83, which is the rail assembly for supporting elements 71 and cathodes for treatment, and 84 which is a shaft for operating a device for discharging trough 76.

Figure 8:
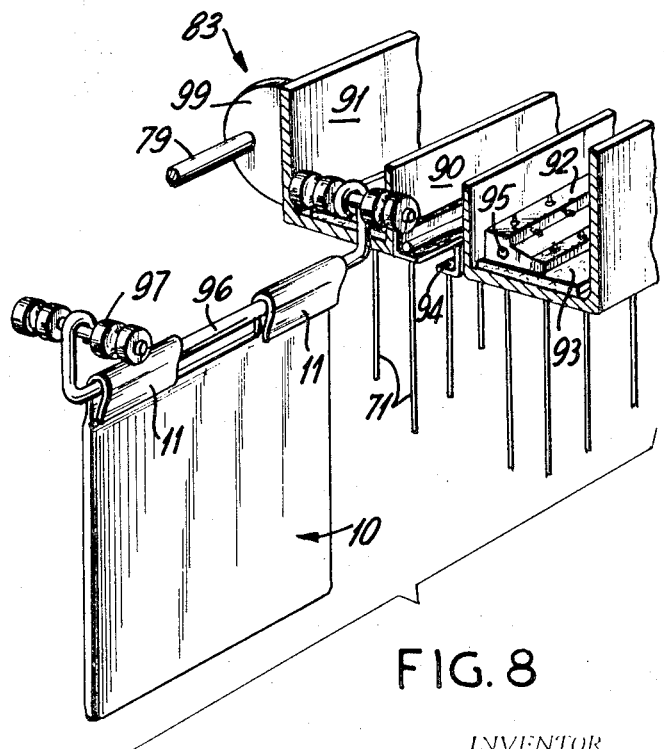
FIG. 8 is a perspective view of part of the apparatus of FIG. 6 showing how the cathode plates are inserted into the apparatus of FIG. 6.

With reference now to FIG. 8 which illustrates in enlarged view the rail assembly 83 and the means of support of a cathode 10 on rail assembly 83, 90 is one of two identical steel rails each being part of U-shaped steel channels 91 which support copper terminal strips 92 which in turn support and supply electrical current to elements 71. Insulating strips 93 are to prevent electrical contact between terminal strips 92 and channels 91; water cooling tubes 94 and water cooling passage 95 are for moderately cooling assembly 83, terminal strips 92 and the loop portions of the cathodes; and castor assemblies 97 and support bar 96 are for supporting the cathodes along rails 90.

Figure 7:
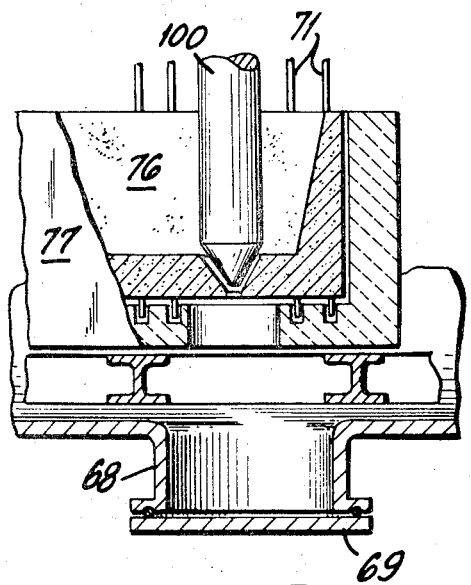
FIG. 7 is an enlarged partial view in section showing a portion of the apparatus of FIG. 6.

With reference now to FIG. 7 which illustrates the conventional device for discharging trough 76, 100 is a conventional graphite stopper rod which is raised and lowered via a linkage mechanism (not shown) operated by shaft 84 which enters tank 50 via vacuum tight shaft entry 53. The tapered hole in the bottom of trough 76 into which stopper rod 100 seats is located above the center of port 68 in tank 50 so that, with cover 69 removed and stopper rod 100 raised, molten copper in trough 76 flows directly out of tank 50.

With reference now to FIGS. 6—8, a typical operation of the apparatus will be described. From a cold start, that is with all the supplies turned off and the apparatus filled with air, the first batch of cathodes is loaded with inner door 62 open, as shown in FIG. 6. Next both inner door 62 and outer door 51 are closed and the vacuum pumping system is turned on so as to exhaust the air from tank 50. Next, the vacuum pumping system is turned off and a mixture of nitrogen and hydrogen (for example 85 percent nitrogen and 15 percent hydrogen) is allowed to fill tank 50, via a connection in utility port 56, and having filled tank 50 is allowed to flow through the tank at a moderate rate, exiting via a valve in vacuum manifold 67. Next, the electrical supply to elements 71 and the water supply to the various water cooled parts are turned on and the current through elements 71 is regulated to bring the temperature of the cathodes to between 800° C. and 1,000° C., this temperature being measured by optical means through viewing port 55. Next, after about 20 minutes with the cathodes at between 800° C. and 1,000° C., the flow of nitrogen-hydrogen mixture is cut off by closing both inlet and outlet connections and the vacuum pumping system is turned on. Next, after the pressure in tank 50 has reduced to about 1 mm. of mercury, as determined by a gauge connected to utility port 56, the upward movement of reflectors 72 is initiated, by switching on a drive motor connected to shaft 79, so as to initiate progressive melting of the cathodes as previously described. Next, after completing the progressive melting in a period of about 10 minutes, reflectors 72 are returned to their lowermost position and the current through elements 71 is regulated so as to bring the molten copper in trough 76 to the desired casting temperature, which may be about 1,150° C., as determined by thermocouples embedded in trough 76. Next, after the molten copper in trough 76 has attained the desired temperature and the vacuum pumping system is switched off and nitrogen is admitted to tank 50, via a valve in manifold 67, and after filling tank 50 is then flowed through tank 50 at slightly positive pressure, exiting via utility port 56. Next, cover 69 on casting port 68 is removed and a copper casting mold which has previously been purged with nitrogen is connected to port 68. Next, stopper rod 100 is raised so as to allow molten copper to flow out of trough 76 into the casting mold at an appropriate rate. Next, after trough 76 has emptied of molten copper and after the copper in the casting mold has solidified throughout, the casting mold is removed from port 68, cover 69 is replaced and the apparatus is now ready to treat a further batch of cathodes. The purpose of inner door 63 will now be apparent since considerable time can be saved if the next batch of cathodes can be loaded without necessity of allowing the hot parts of the apparatus to cool: To load the next batch of cathodes outer door 51 is opened while inner door 62 is kept closed, the caster assemblies 95 carrying the loops from the previous batch are withdrawn and the new batch of cathodes is loaded via slot 63 in door 62. Whilst this unloading and loading operation is being accomplished the flow of nitrogen into tank 50 is increased so as to prevent substantial entry of air into tank 50 via slot 63, this being practical only because of the relatively small area of slot 63.

From the above, at least the main details of the construction and operation of an apparatus in accordance with the present invention for batch purifying cathode copper while coincidentally melting and casting this copper into useful shapes for fabrication of products, will by now be understood. It will be appreciated of course that minor details of construction and operation have been omitted from the above description; these details are readily obtained from conventional practice. It remains therefore in completion of this specification only to remark upon the advantages and disadvantages of the above-described batch type purification apparatus as compared to a continuous type purification apparatus, as may be based on FIG. 3.

A continuous purification apparatus is essentially one into which unpurified material is continuously fed and out of which purified material is continuously discharged. Accordingly, a continuous apparatus for conducting a purification procedure such as described above is one in which cathodes are continuously passed into and preheated in hydrogen bearing atmosphere, are then continuously passed into and melted in low-pressure atmosphere and are then continuously discharged out in purified molten state. This is to say, visualizing, for example, such a continuous apparatus based on FIG. 5, the preheat zone is separated from the melt zone by a vacuum lock through which pass hot solid cathodes and the melt zone terminates in a second vacuum lock through which discharges purified molten copper. It will be readily understood that such a continuous apparatus, particularly in respect of the vacuum locks, is greatly more complicated and expensive than the batch apparatus of FIG. 6. However, it will equally be understood that the simultaneous performance by this continuous apparatus of all parts of the treatment and the consequent elimination of purging cycles for replacing one atmosphere with another and of loading and discharging cycles, leads to a generally more efficient operation. Hence, finally, it will be understood that for a relatively small scale production and for varying requirements as to degree of purification a batch apparatus such as in FIG. 6 has considerable economic advantage which advantage, however, reduces in favour of a continuous apparatus such as may be based on FIG. 5 as the scale and consistency of production increases.

The apparatus of the present invention may of course be employed in refining cathode copper where it is desired to melt the copper in a hydrogen-bearing atmosphere for example as is disclosed in my copending application. Melting the plates in a hydrogen bearing atmosphere using apparatus of the present invention affords an efficient means for introducing large quantities of hydrogen into the molten copper since the primary exposure of a thin molten film of copper and the secondary exposure of the molten copper as it drips and runs through the various channels of the apparatus of the present invention provide maximum exposure of the copper to the hydrogen atmosphere. Either the previously discussed batch type or continuous type apparatus may of course be so employed but the particular adaptability of the continuous type apparatus illustrated in FIG. 5, will be well understood with reference to the "zone type" furnace described in that copending application.

I claim:

1. Apparatus for purifying copper, including an enclosure, suspension means for suspending a copper cathode plate within said enclosure, heating means for heating and melting said suspended plate from bottom to top, and atmosphere controlling means for furnishing controlled atmosphere within said enclosure.

2. Apparatus as in claim 1, wherein said atmosphere controlling means includes means for generating a hydrogen-bearing atmosphere and means for generating an atmosphere having low pressure as compared to atmospheric pressure.

3. Apparatus for purifying copper, including an enclosure, suspension means for suspending a copper cathode plate within said enclosure, heating means for heating the plate over an area of a face of the plate, said heating being sufficient to melt copper over said area, means for moving the plate to cause said heating to occur over progressively higher areas on said face to melt said plate from bottom to top, and atmosphere controlling means for furnishing controlled atmosphere within said enclosure.

4. Apparatus for purifying copper, including an enclosure, suspension means for suspending a copper cathode plate within said enclosure, heating means for heating the plate over an area of a face of the plate, said heating being sufficient to melt copper over said area, means for moving the heating means to cause said heating to occur over progressively higher areas on said face to melt said plate from bottom to top, and atmosphere controlling means for furnishing controlled atmosphere within said enclosure.

5. Apparatus as in claim 4, further including a channel below said suspended plate for transporting molten copper dripping from said suspended plate and a trough below said channel for accumulating molten copper transported by said channel.

6. Apparatus for purifying copper including a sealed enclosure, means for suspending a cathode copper plate within the enclosure, means for controlling the atmosphere in the enclosure, heating means for heating the plate, heat-concentrating means movable with respect to the plate for raising the temperature of a portion of the face of the plate to above melting temperature proceeding from bottom to top.

7. Apparatus as in claim 6, wherein said atmosphere controlling means includes means for furnishing an atmosphere at substantially atmospheric pressure containing hydrogen and means for furnishing an atmosphere at low pressure compared to atmospheric pressure.

8. Apparatus as in claim 6, wherein said heating means includes a resistance heating element adjacent to said suspended plate and a reflector adjacent to the heating element on the side of the heating element remote from the plate, outside said heating element, whereby radiative heat loss from said heating element and from said suspended plate is reduced.